(12) United States Patent
Tucker (10) Patent No.: US 6,346,199 B1
(45) Date of Patent: *Feb. 12, 2002

(54) SEDIMENT FILTERING SYSTEM

(76) Inventor: Randall L. Tucker, 7440 Township Rd. 95, Findlay, OH (US) 45840

(*) Notice: Subject to any disclaimer, the term of this patent is extended or adjusted under 35 U.S.C. 154(b) by 0 days.

This patent is subject to a terminal disclaimer.

(21) Appl. No.: 09/535,249

(22) Filed: Mar. 27, 2000

Related U.S. Application Data (63) Continuation-in-part of application No. 09/140,521, filed on Aug. 26, 1998, now Pat. No. 6,042,733.
(60) Provisional application No. 60/057,347, filed on Aug. 26, 1997.

(51) Int. Cl.[7] .................................................. E02B 8/02
(52) U.S. Cl. ........................ 210/747; 210/804; 210/155; 210/170
(58) Field of Search ................................ 210/747, 804, 210/155, 162, 163, 170, 299, 300, 301, 532.1, 534; 405/74; 299/8

(56) References Cited

U.S. PATENT DOCUMENTS

| | | | |
|---|---|---|---|
| 316,578 A | * 4/1885 | Schumann et al. | |
| 1,094,310 A | 4/1914 | Deal | 210/170 |
| 1,290,470 A | * 1/1919 | Yordy | |
| 1,510,058 A | 9/1924 | Heller | 210/155 |
| 1,858,231 A | 5/1932 | Parshall | 210/170 |
| 2,073,122 A | 3/1937 | Silke | 299/8 |
| 4,397,503 A | 8/1983 | Williams | 405/74 |

* cited by examiner

Primary Examiner—David A. Simmons
Assistant Examiner—Frank M. Lawrence
(74) Attorney, Agent, or Firm—Fay, Sharpe, Fagan, Minnich & McKee, LLP (57) ABSTRACT

A sediment filtering apparatus and a method for removing sediment from a waterway. One or more collector assemblies are secured to a river bottom and have a leading, ramp surface facing upstream and over which the water flows. As the water/sediment mixture passes the apex of the collector, the trailing edge drops off rapidly thereby reducing the stream velocity and allowing the sediment to settle from the flow. The sediment then collects on the downstream side of the collector and via one or more openings reaches an internal cavity. A suction pipe is placed under negative pressure and draws the water/sediment mixture to a filtering apparatus which then returns filtered water to the waterway. The sediment and debris filtered therefrom is then easily removed.

19 Claims, 8 Drawing Sheets

SEDIMENT FILTERING SYSTEM

This application is a continuation-in-part application of Ser. No. 09/140,521, filed Aug. 26, 1998, now U.S. Pat. No. 6,042,723, and also claims the benefit of provisional application Serial No. 60/057,347, filed Aug. 26, 1997.

BACKGROUND OF THE INVENTION

This application is directed to an apparatus and method/process for removing sediment from a body of water such as a stream, river, delta, shoreline (seashore or lakeshore).

It is often desirable to remove sand and sediment from rivers, creeks, and the like. Run-off from adjacent land results in increased sediment, sand, and other debris collecting in the waterway. Heretofore, there has not been an effective, economical solution to this problem. Accordingly, a need exists that is effective, inexpensive, easy to set up, and capable of adapting to the body of water without unduly disturbing the environment.

SUMMARY OF THE INVENTION

The present invention contemplates a new and improved apparatus and method for removing sediment from a body of water which overcomes the above-referenced problems and others and provides a simple, economical structure that is effective in filtering and removing material.

According to the present invention, the sediment removing apparatus includes a first surface disposed adjacent the bottom of the body of water and oriented so that a portion extends upwardly from the bottom and terminates in a trailing surface that extends toward the bottom at a steeper slope than the first surface. A cavity in the apparatus communicates with the trailing surface to receive the water and sediment mixture therein and a filtering assembly communicates with the cavity to separate the sediment from the water.

According to another aspect of the invention, a prefiltering member may be disposed over the opening to the cavity to prevent large size materials from entering the cavity.

According to another aspect of the invention, the filtering assembly is disposed outside of and adjacent to the waterway in a suitable position for sediment collection and disposal.

Still another aspect of the invention resides in the ability to easily modify the sediment removing apparatus to control the type of material removed from the water.

According to a preferred method of removing sediment, the collector apparatus is positioned in the water so that the trailing surface reduces the velocity of the water and sediment mixture passing thereover. The water and sediment mixture is transferred from the trailing surface to a filter assembly and the filtered water is reintroduced from the filter assembly to the body of water.

According to another step in the process, the collector apparatus is fastened to a bottom surface of the waterway.

A principal advantage of the invention resides in the provision of an effective, economical structure that removes sediment from bodies of water.

Yet another advantage of the invention is the limited disturbance to the environment.

Still other advantages and benefits of the invention will become apparent to those skilled in the art upon a reading and understanding of the following detailed description.

BRIEF DESCRIPTION OF THE DRAWINGS

The attached drawings illustrate preferred embodiments of the invention. It will be understood, however, that the invention may embody some or all of the illustrated principles, as well as slightly different configurations thereof.

DETAILED DESCRIPTION OF THE PREFERRED EMBODIMENTS

Figure 1:
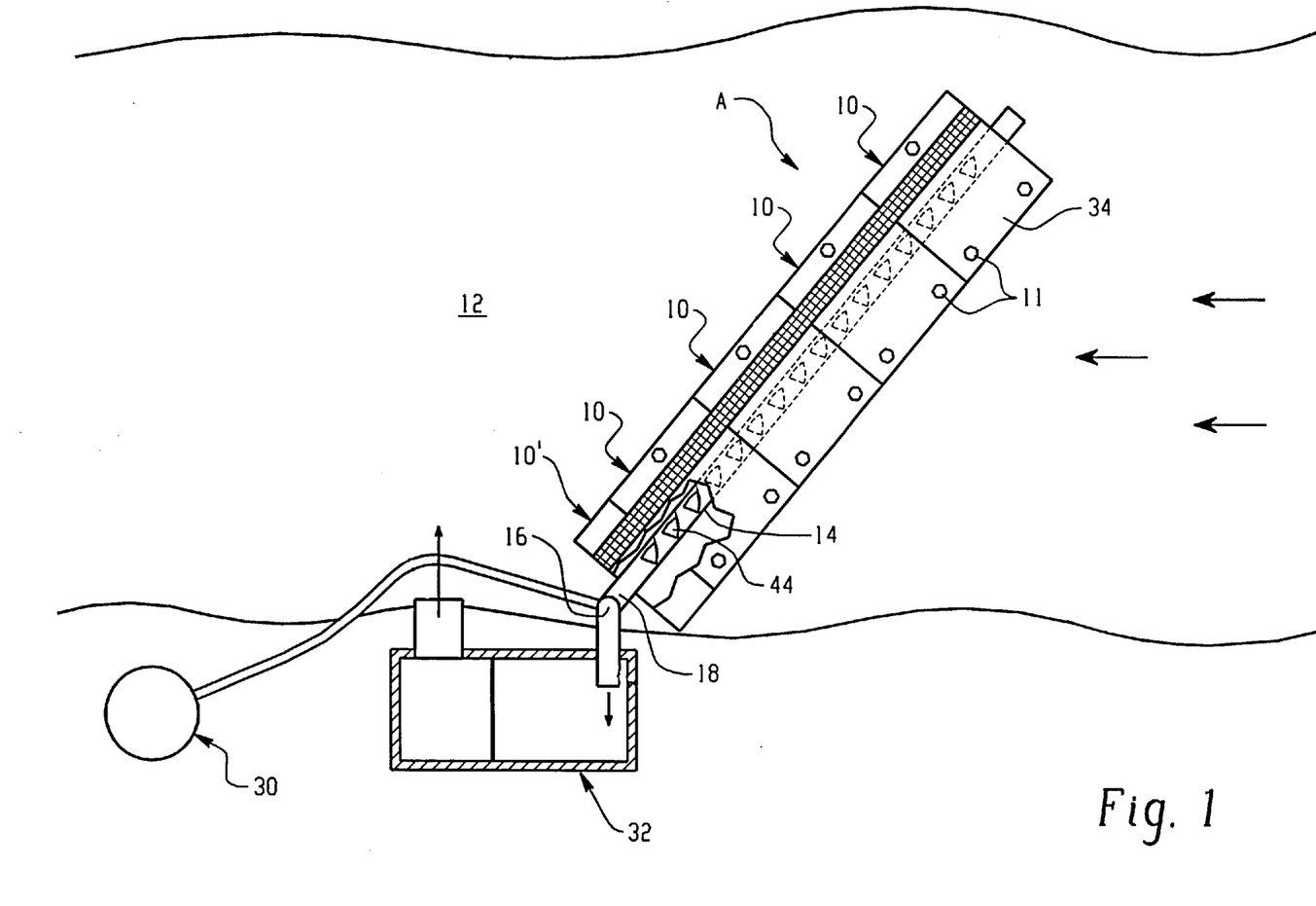
FIG. 1 is a schematic representation of the location of a sediment removal system in the basin of a waterway.

Referring now to the drawings where the showings merely illustrate the preferred embodiments of the invention and are not intended to limit the invention, FIG. 1 schematically represents the sediment filtering system A and method. More particularly, interlocking collector assemblies 10 are located and preferably secured via fasteners 11 on a body of water such as a river bottom 12 and preferably completely span the river substantially perpendicular to the flow of the water. The collectors have a common suction pipe 14 that passes through each collector and the last collector 10' has a water ejector 16 connected to a suction line 18. A water pressure supply system 30 is applied to the ejector. The function of the ejector causes the suction line to become pressurized forcing sediment and water mixture into a filter system 32. The filter system is placed on the outflow, which extends out of the stream bank and is located in a suitable position for sediment collection and disposal.

Figure 2:
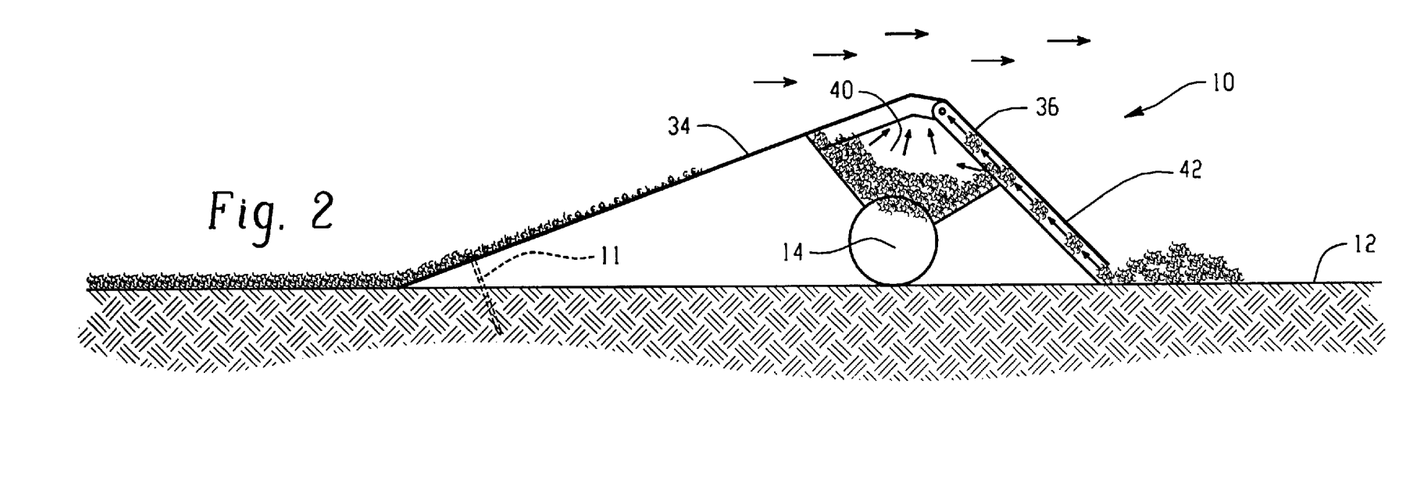
FIG. 2 is an elevational view of the preferred embodiment of the invention.

The sediment collector is of a design that allows for the compression of the sediment as it moves up a ramp 34 (defined by the collector) that faces upstream (FIG. 2). As this mixture of sediment and water passes the apex of the collector, a trailing edge 36 of the collector drops out rapidly increasing the stream depth. This increase in depth reduces the velocity of the stream which allows the sand or sediment to drop out of the flow. A manifold is designed to allow the sediment to collect on the downstream side against the wall of the collector. This positions sediment in the entrance to the suction channels. The capture of sediment is accomplished in a large hollow cavity 40 internal to the collector and atop of the suction tube 14. Vertical suction channels 42 pull the concentrated sediment and water mixture up into the cavity. The apex of the collector is designed with a lateral opening which provides for the generation of a negative pressure or suction in the cavity. This is accomplished by the friction of the laminar flow over the apex which draws water from the cavity thus providing the suction. The ratio of cavity area and suction capacity provides a reduction in velocity of the concentrated sediment and water mixture. The reduction of velocity in the cavity allows the sediment to deposit or fall out of the water. As the sediment drops out, it falls on top of the suctioned pipe 14 that has ports 44 along its length. These ports pull the sediment into the suction pipe which ultimately flows to the filter system on the stream bank. The filter system 32 separates the water from the sediment and then returns the filtered water to the river.

Figure 3:
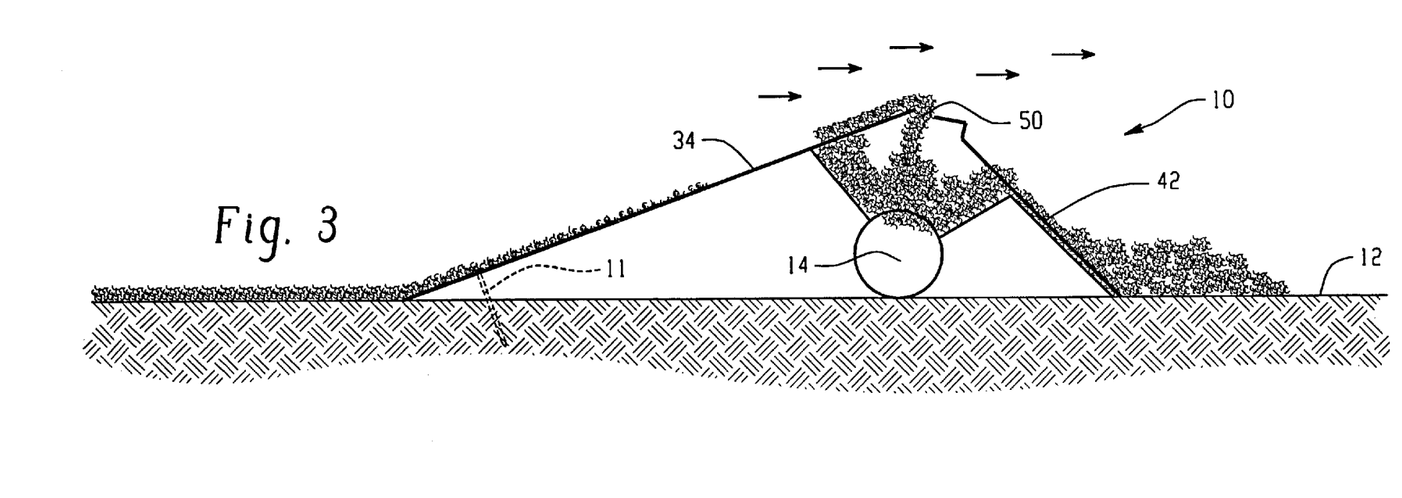
FIG. 3 is an elevational view of an alternate embodiment similar to that of FIG. 2.

The embodiment of FIG. 3 is substantially identical to that shown and described with respect to FIGS. 1 and 2. Accordingly, like numerals are used to identify like elements. It is slightly modified to include an opening 50 adjacent the apex that allows sand or sediment to fall directly into the cavity 40. Thus, if there is a large amount of sediment, it is directed toward the suction pipe in combination with the sediment and sand that travels to the suction pipe through the suction channels.

Figure 4:
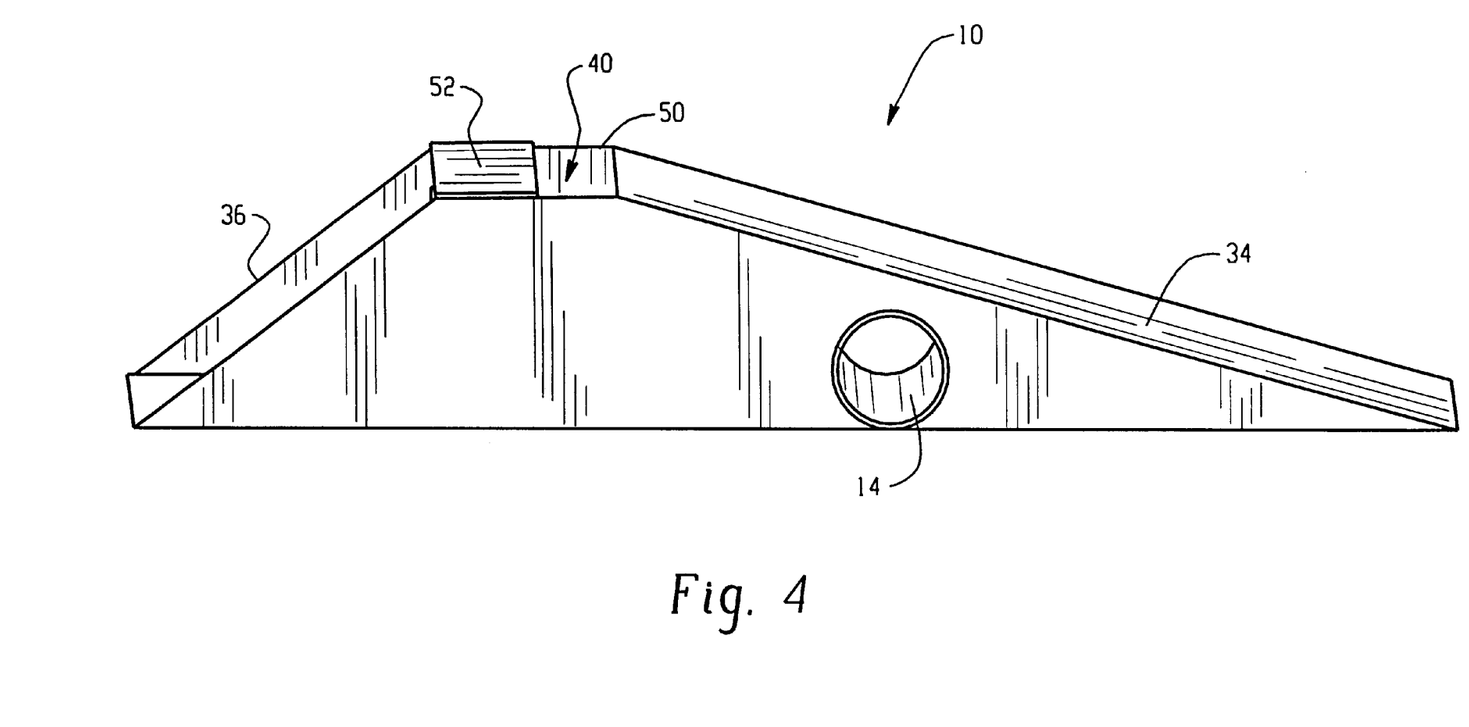
FIG. 4 is a perspective view of another preferred embodiment of the invention.
Figure 5:
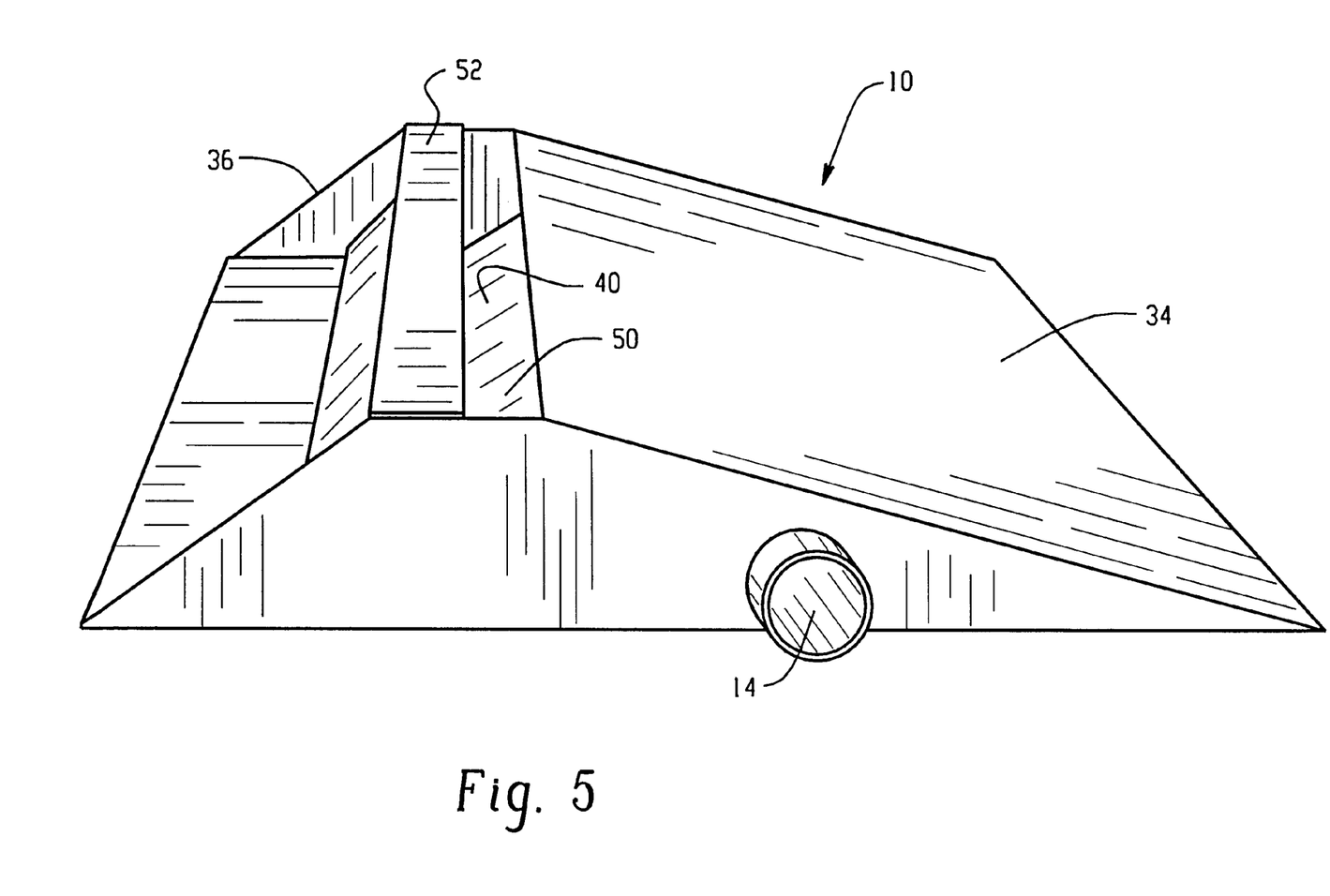
FIG. 5 is a perspective view of yet another preferred embodiment similar to that of FIG. 4.
Figure 6:
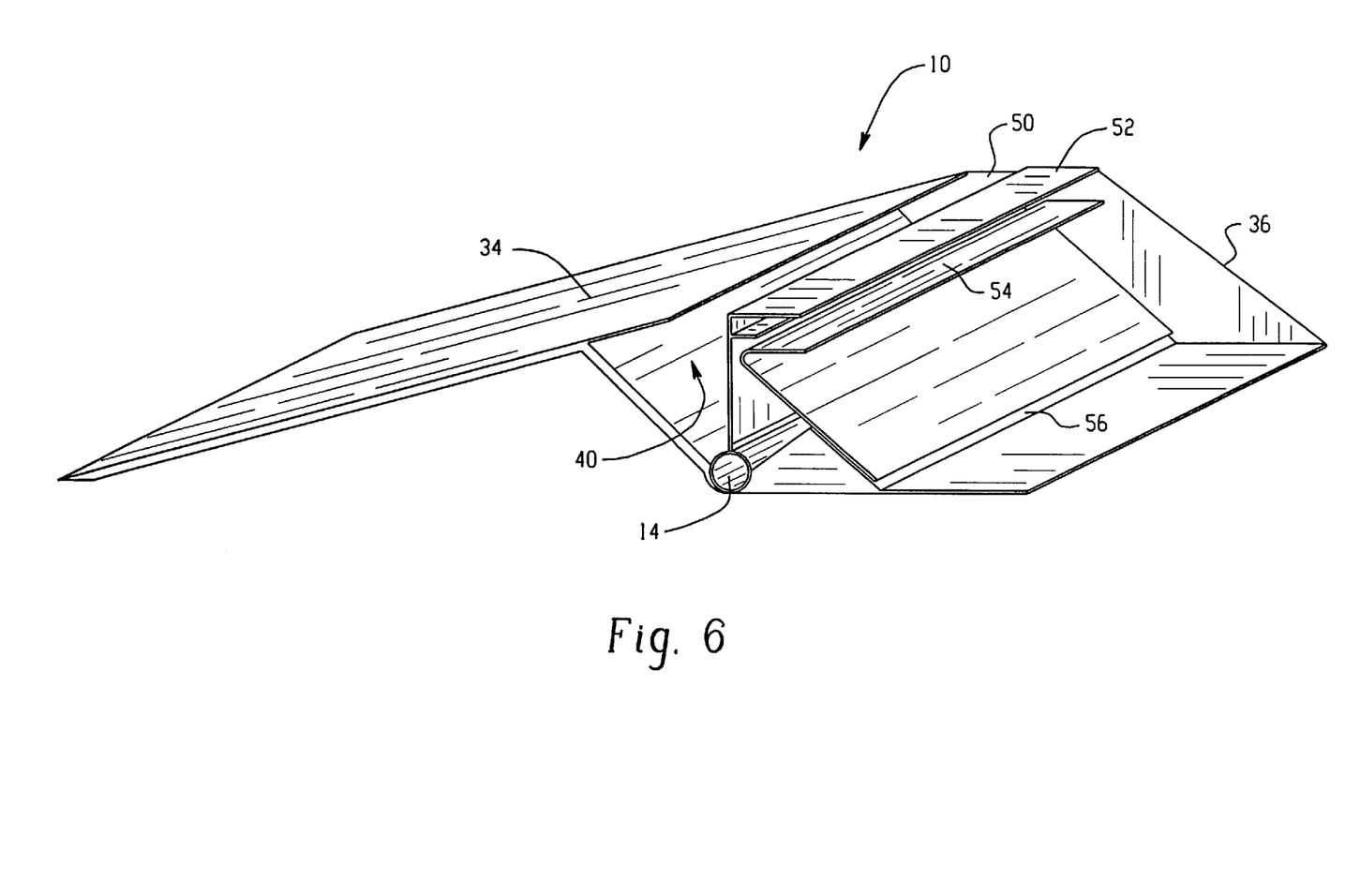
FIG. 6 is a perspective view of yet another embodiment.

Turning to FIG. 4, the suction pipe 14 in the collector 10 is positioned forwardly of the opening to the cavity 40, i.e., beneath the upstream or ramp surface 34 of the collector. This is also illustrated in FIGS. 5 and 6 where the cavity is more clearly illustrated. As seen in FIG. 6, the collector sections, including openings to the cavity and to the suction pipe, can be easily formed as an integral molded element. A series of elongated channels or openings are formed in the collector surface for communication with the internal cavity. In this manner, the first opening 50 can be located at the apex where the leading ramp surface 34 merges into a generally planar upper surface 52. Opening 50 is one area where the water and sediment mixture would fall out and enter the cavity 40 of the collector device. In addition, additional openings 54, 56 are provided in the trailing edge and due to the suction forces imposed by the filtering assembly, the water and sediment would be drawn toward the suction pipe.

Figure 7:
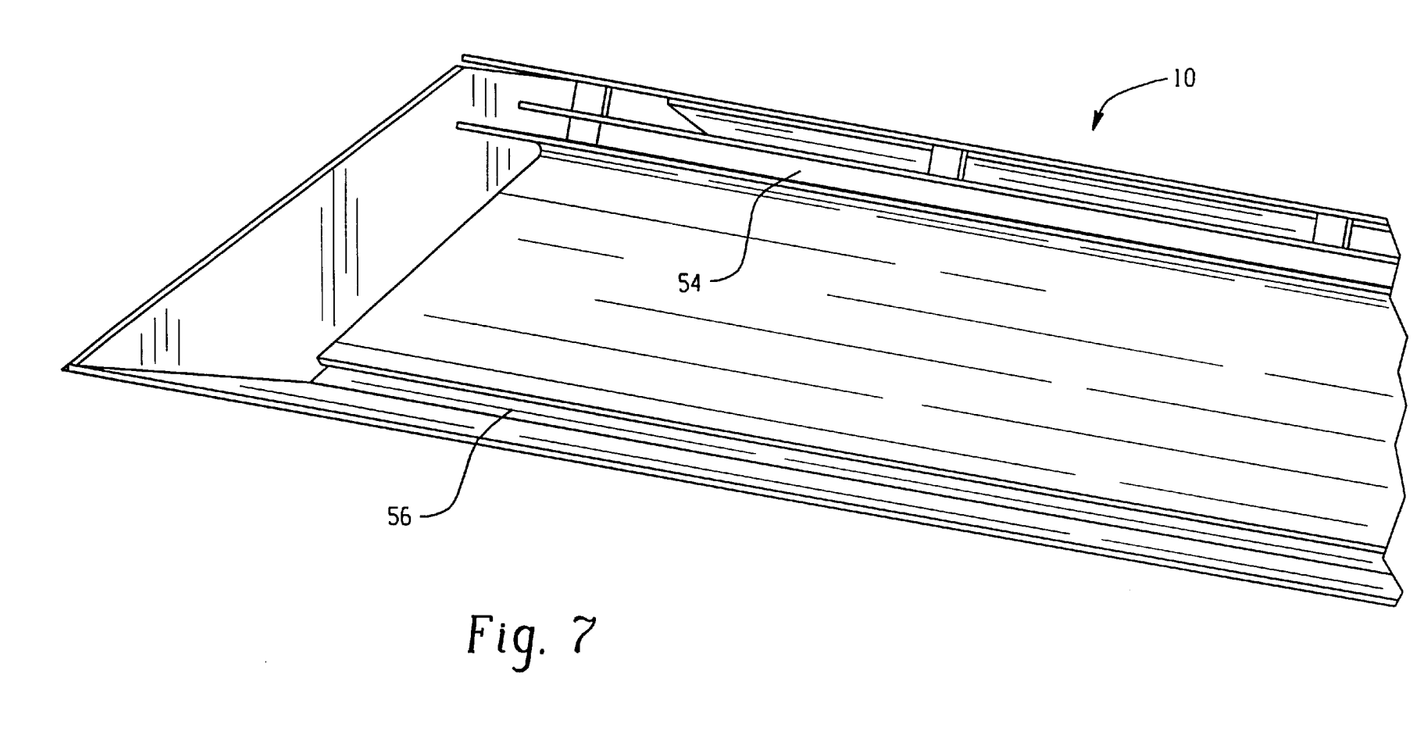
FIG. 7 is a generally rear elevational view of the embodiment of FIG. 6.

FIG. 7 is merely a further illustration of the rear surface to show the openings 54, 56 and how the openings are formed therein and extend over the entire width of the rear surface.

Figure 8:
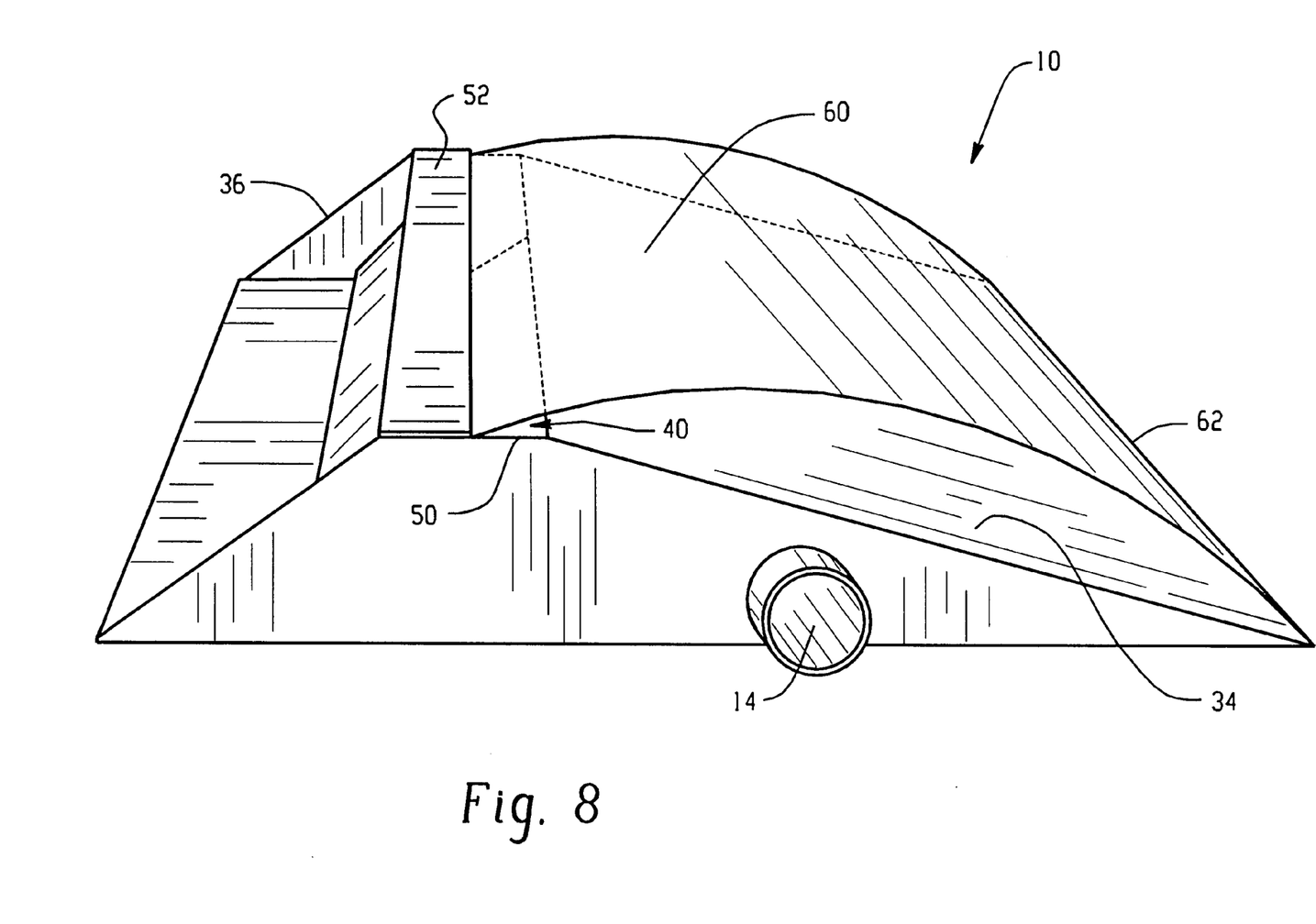
FIG. 8 is a perspective view similar to FIG. 5 illustrating a preferred form of prefiltering.

FIG. 8, illustrates the same general structure of FIG. 5 with an additional prefiltering member 60 provided therein. The prefiltering member is shown here as an arched framework extending from the leading edge 62 and covering the opening 50 to the cavity. As will be appreciated, the openings in the prefiltering member are relatively large and are designed to have little impact on the flow of the water carrying the sediment up the leading edge of the collector. Instead, the large openings prevent large size particles such as sticks, stones, etc., from clogging or blocking the opening to the cavity.

Figure 9:
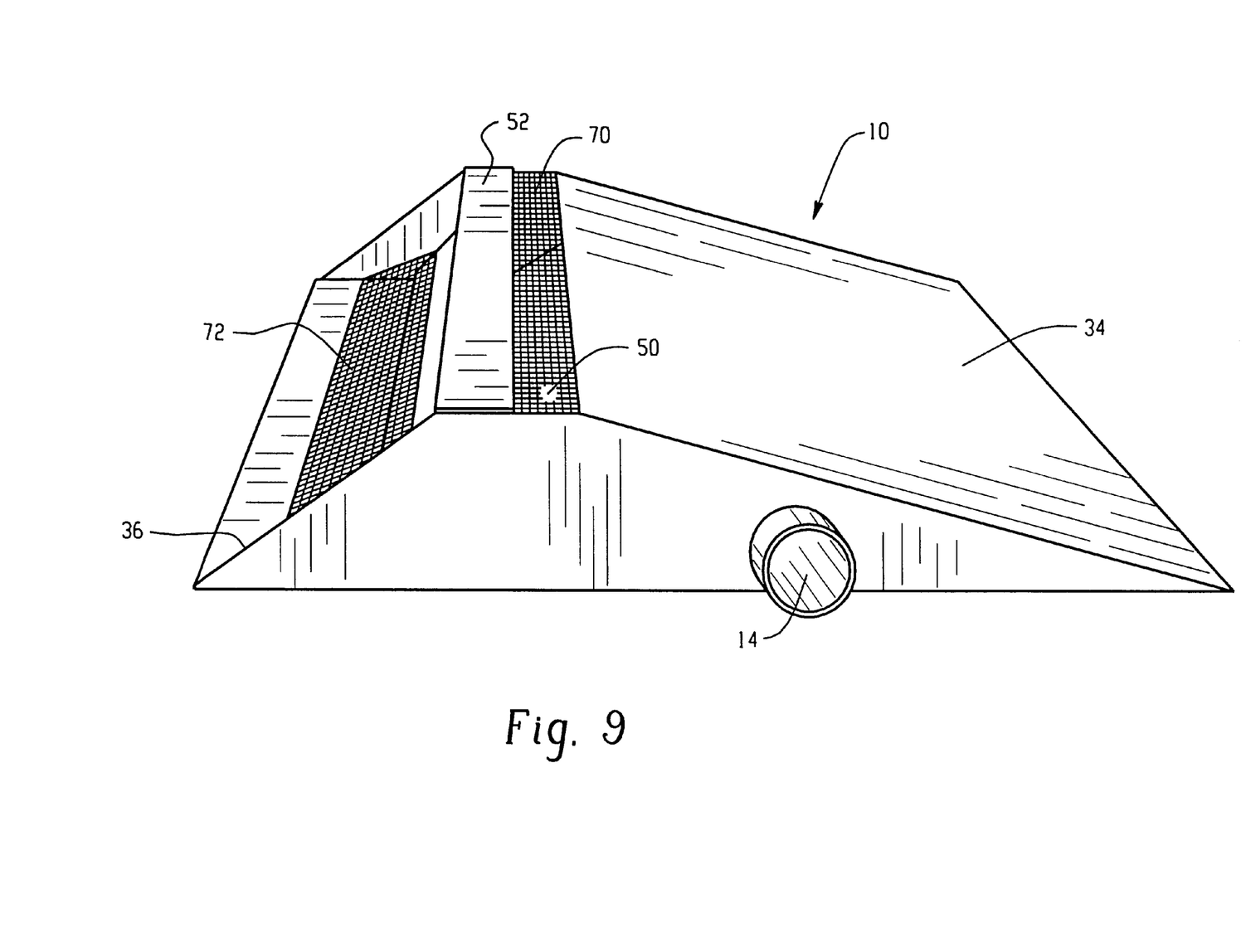
FIG. 9 is a perspective view of the collector of FIG. 5 with yet another preferred form of prefiltering member.

FIG. 9 illustrates a pair of grates 70, 72 that are intended to cover the various openings, for example, openings 50, 54, etc. that provide access to the cavity. Again, the openings in the grate are relatively large so that large material is precluded from entering the cavity.

Accordingly, it will be appreciated that other modifications to this structure are contemplated. For example, it is envisioned that openings may also be provided on the upstream sediment ramp 34 for selected applications. However, such modifications and changes are deemed to be within the scope of the overall process described above.

The collectors are designed to collect sand or sediment in two ways as described above. First, the front ramp compresses the sediment as it moves downstream. As the sediment reaches the opening at the apex it falls into the collection chamber or cavity. Materials with less weight and debris are forced past the opening in the apex and downstream. Second, eddy currents are created by the water flowing over the collectors. Some sand and sediment that passes the collecting apex opening falls out of the current below or downstream of the collector. This sediment is then pushed back upstream to the trailing edge of the apex where it reaches the cavity.

The collectors are preferably suctioned down individually through the use of pinch valves connected to the main suction line that passes through all of the collectors. These pinch valves are operated using water pressure and are sequenced using electronic controllers. Suction is generated using the water ejector system to convey the water and sediment mix to the filter system located on the shore where the sediment is separated from the pump.

It is also contemplated that the collector can be modified from the fixed dimension opening along the apex to an adjustable opening. As will be appreciated, the fixed dimension opening is less expensive to manufacture and can be tailored to a particular waterway to remove a desired size or type of sediment. By adjusting the size of the opening and the location of the opening, the type of material being removed from the waterway can be preselected. The location and size of the opening will remove sediment and debris of a certain specific gravity so that greater control over the type of material removed is attained.

A movable apex gate may also be incorporated into the design. The pivotable gate can be picked up to purge all of the debris that may have collected over time in the collector. If necessary, movement of the pivoted apex gate may be achieved with a power assist such as a hydraulic cylinder or equivalent power lift. Such a powered apex gate would also include a separate controller system.

The collector concept and design is a primary feature of the system. The applications/installations will determine which suction/pressure supply and filter system is required to provide the required end result. Thus, it will be appreciated that the details of the invention may be altered but still fall within the general scope and intent of my invention. Likewise, the collectors may find particular application along shorelines to efficiently move sand for beach reclamation projects. Depending on the particular application, the collectors are dimensioned and manufactured form materials that may be more suitable for portability or for permanent installation. For example, where some collectors can be manually manipulated into location in the waterway, other collectors formed from concrete may require a crane to position in place. Alteratively, it may be necessary to use a pour-in-place concrete design. All of these collector arrangements, however, employ one or more of the structural and functional features described above with respect to FIGS. 1–9.

Having thus described the invention, it is claimed:

1. An apparatus for removing sediment from a bottom of a waterway comprising:

a first surface disposed adjacent the bottom of the waterway and oriented so that at least a portion of the first surface extends upwardly and terminates at an apex adjacent a trailing surface that extends toward the waterway bottom at a steeper slope than the first surface to reduce the velocity of the water and sediment passing thereover;

a cavity in the apparatus disposed adjacent the apex for receiving water and sediment therein; and a filter assembly in operative communication with the cavity for separating the sediment from the water, the filter assembly including a first passage extending from the cavity for transferring the water and sediment therefrom to a filter member positioned outside of and adjacent to the waterway.

2. The apparatus of claim 1 wherein the filter assembly includes a second passage extending from the filter member for returning filtered water to the waterway.

3. The apparatus of claim 1 wherein the first surface and the trailing surface define a generally triangular cross-sectional configuration with the waterway bottom.

4. The apparatus of claim 3 further comprising an opening in the trailing surface in communication with the cavity for receiving water and sediment therethrough.

5. The apparatus of claim 4 further comprising an adjustable gate over the opening for receiving water and sediment therethrough.

6. The apparatus of claim 5 further comprising a pre-filtering member disposed adjacent the opening for preventing large sized material from entering the opening.

7. The apparatus of claim 5 further comprising a pre-filtering member disposed adjacent the opening for preventing large sized material from entering the opening.

8. The apparatus of claim 7 wherein the pre-filtering member includes a portion that extends in overlying, spaced relation to the first surface.

9. The apparatus of claim 1 further comprising a fastener for securing the apparatus to the waterway bottom.

10. The apparatus of claim 1 further comprising a porous suction passage disposed in the cavity for conveying sediment and water to the filter assembly.

11. A method of removing sediment from a waterway comprising the steps of:
   positioning a collector apparatus in a waterway, the collector apparatus including a trailing surface disposed downstream that reduces the velocity of the water and sediment passing thereover;
   transferring water and sediment from an opening adjacent an apex of the trailing surface to a filter assembly where the sediment is separated from the water; and
   conveying the filtered water from the filter assembly to the waterway.

12. The method of claim 11 wherein the positioning step includes the step of fastening the collector apparatus to a bottom surface of the waterway.

13. The method of claim 11 wherein the transferring step includes passing the water and sediment through a filter member disposed adjacent the waterway.

14. The method of claim 12 comprising the further step of providing a pre-filtering member over an opening in the trailing surface for removing large sized material from the water.

15. The method of claim 11 comprising the step of providing an opening in the collector apparatus adjacent the trailing surface and applying a vacuum to the opening for drawing water and sediment into the collector apparatus.

16. An apparatus for removing sediment from a bottom of a waterway comprising:
   a first surface disposed adjacent the bottom of the waterway and oriented so that at least a portion of the first surface extends upward and terminates at an apex adjacent a trailing surface that extends toward the waterway bottom at a steeper slope than the first surface to reduce the velocity of the water and sediment passing thereover;
   a cavity in the apparatus disposed adjacent the apex for receiving water and sediment therein;
   a filter assembly in operative communication with the cavity for seperating the sediment from the water; and
   a porous passage disposed in the cavity for conveying sediment and water to the filter assembly.

17. The apparatus of claim 16 wherein the filter assembly includes a first passage extending from the cavity for transferring the water and sediment therefrom to a filter member positioned outside of and adjacent to the waterway.

18. The apparatus of claim 17 wherein the filter assembly includes a second passage extending from the filter member for returning filtered water to the waterway.

19. The apparatus of claim 16 further comprising an opening in the trailing surface in communication with the cavity for receiving water and sediment therethrough.

* * * * *